(12) United States Patent
Gueta et al.

(10) Patent No.: US 12,124,704 B2
(45) Date of Patent: Oct. 22, 2024

(54) SYSTEMS AND METHODS FOR IMPROVING FIND LAST GOOD PAGE PROCESSING IN MEMORY DEVICES

(71) Applicant: Western Digital Technologies, Inc., San Jose, CA (US)

(72) Inventors: Asaf Gueta, Ganei Tikva (IL); Arie Star, Fremont, CA (US); Omer Fainzilber, Kfar-Saba (IL); Eran Sharon, Rishon Lezion (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/356,693

(22) Filed: Jul. 21, 2023

(65) Prior Publication Data

US 2024/0192859 A1    Jun. 13, 2024

Related U.S. Application Data

(60) Provisional application No. 63/431,884, filed on Dec. 12, 2022.

(51) Int. Cl.
*G06F 3/06* (2006.01)

(52) U.S. Cl.
CPC ........... *G06F 3/0614* (2013.01); *G06F 3/064* (2013.01); *G06F 3/0679* (2013.01)

(58) Field of Classification Search
CPC ....... G06F 3/0614; G06F 3/064; G06F 3/0679
See application file for complete search history.

(56) References Cited

U.S. PATENT DOCUMENTS

| 9,459,881 | B2 | 10/2016 | Tuers et al. |
| 9,946,485 | B1 | 4/2018 | Don et al. |
| 11,126,368 | B2 | 9/2021 | Eliash et al. |
| 2011/0145186 | A1* | 6/2011 | Hempelmann ..... G06F 16/2477 |
| | | | 711/118 |
| 2020/0097188 | A1 | 3/2020 | Gunda et al. |
| 2020/0310926 | A1 | 10/2020 | Lee et al. |
| 2020/0326853 | A1 | 10/2020 | Lee |
| 2020/0348880 | A1 | 11/2020 | Eliash et al. |
| 2023/0400899 | A1* | 12/2023 | Gunda ................. G06F 3/0679 |

* cited by examiner

*Primary Examiner* — Aracelis Ruiz
(74) *Attorney, Agent, or Firm* — Armstrong Teasdale LLP

(57) ABSTRACT

A storage device includes a memory die and a controller. The controller identifies a dirty block that was subject to an interrupted I/O operation and performs a coarse inspection of the dirty block. Each iteration of the coarse inspection includes: requesting first bytes of a current page of the dirty block; receiving contents of the first bytes from the at least one memory die; and evaluating a state of the current page based on the contents of the first bytes. The controller also determines an initial last good page based on the coarse inspection and performs a fine inspection of at least one page based on a second number of bytes greater than the first number of bytes. The fine inspection validates the initial last good page and identifies the initial last good page as an actual last good page of the dirty block.

20 Claims, 5 Drawing Sheets

SYSTEMS AND METHODS FOR IMPROVING FIND LAST GOOD PAGE PROCESSING IN MEMORY DEVICES

CROSS-REFERENCE TO RELATED APPLICATIONS

The present application claims priority to U.S. Provisional Application 63/431,884 entitled "SYSTEMS AND METHODS FOR IMPROVING FIND LAST GOOD PAGE PROCESSING IN MEMORY DEVICES", filed Dec. 12, 2022, the entire disclosure of which is hereby incorporated by reference in its entirety.

BACKGROUND

Semiconductor memory and storage devices are widely used in various electronic devices such as cellular telephones, digital cameras, personal digital assistants, medical devices, mobile computing devices, and non-mobile computing devices. Semiconductor memory may include non-volatile memory or volatile memory. A non-volatile memory allows information to be stored and retained even when the non-volatile memory is not connected to a power source (e.g., a battery). Examples of non-volatile memory include flash memory (e.g., NAND-type and NOR-type flash memory) and Electrically Erasable Programmable Read-Only Memory (EEPROM).

Typically, a memory system includes one or more memory dies. Each of the one or more memory dies includes one or more memory planes, each consisting of a plurality of memory blocks. During programming of the memory system, a controller of the memory system performs programming operations (e.g., read operations, write operations, other suitable operations, or a combination thereof) on pages of a memory block according to commands received by the controller. The memory blocks that the system is currently working with are "open blocks" within the system. When the controller completes all operations for an open block, the controller stores information in persistent memory indicating that programming of the memory block is complete. This process may repeat until programming of the memory system is complete.

During use, various situations may occur that cause the programming operations to be interrupted. In some situations, the memory system may gracefully shutdown. Graceful device shutdown ("GSD") may allow the memory system time to complete any pending operations, such as completing any pending write or erase operations, thus closing some or all of the open blocks after the memory system is shut down. In some GSD situations, some open blocks may remain open but the system stores a last good page ("LGP") indicator that represents a "clear cut" where a partially completed programming operation was stopped (e.g., a particular page of the block). This scenario leaves a "clean" open block, as it includes a clear indication of where the operation stopped within that block. In such GSD situations, the memory system can use the stored LGP to identify where to continue any programming operation upon restart from the place the last operation was stopped, thereby allowing the memory system to complete the programming operation and close the open block when full.

However, some situations cause the memory system to experience ungraceful device shutdown ("UGSD"). UGSD may be caused by, for example, power disruptions or power fluctuations to components of the memory system. Such situations may leave "dirty blocks," or open memory blocks that were interrupted during a programming operation, and for which the system does not have a LGP. When power is restored to the memory system, the controller may be configured to find a last good page of each dirty block, namely a last page of the memory block that was successfully programmed by the controller prior to the interruption. The controller may use the information stored in persistent memory to identify the dirty blocks, but without knowing the LGP for that dirty block, the memory system may inspect the contents of the pages of each dirty block to find the LGP in that memory block (e.g., to allow the memory system to reprogram the remaining portions of each dirty block). Such "find last good page" ("FLGP") processing requires computational overhead and data transfer operations internal to the memory system during restart of the memory system. This FLGP processing adds time to the startup process, delaying the memory system from being available to field new operations. Accordingly, it would be beneficial to reduce the computational complexity and processing time of this FLGP processing.

SUMMARY

The present application describes a storage device. The storage device includes at least one memory die. The storage device also includes a controller electrically connected the at least one memory die, the controller configured to: (i) identify a dirty block of the at least one memory die, the dirty block being a memory block that was subject to an interrupted write operation; (ii) perform a coarse inspection of one or more pages of the dirty block, each iteration of the coarse inspection including: (a) requesting a first number of bytes of a current page of the dirty block from the at least one memory die; (b) receiving contents of the first number of bytes from the at least one memory die; and (c) evaluating a state of the current page based, at least in part, on the contents of the first number of bytes; (iii) determine an initial last good page of the dirty block based, at least in part, on the coarse inspection; (iv) perform a fine inspection of at least one page of the dirty block based, at least in part, on contents of a second number of bytes of the at least one page of the dirty block, the second number of bytes being greater than the first number of bytes, the fine inspection validating the initial last good page identified by the coarse inspection; and (v) identify the initial last good page as an actual last good page of the dirty block.

The present application also describes a memory die. The memory die includes one or more NAND flash memory modules. The memory die also includes a circuitry component configured to: (i) receive a command to identify a last good page of a memory block; (ii) perform a coarse inspection of one or more pages of the memory block, each iteration of the coarse inspection including: (a) sensing a first number of bytes of a current page of the memory block from the one or more NAND flash memory modules; and (b) evaluating a state of the current page based, at least in part, on contents of the first number of bytes; (iii) determine an initial last good page of the memory block based, at least in part, on the coarse inspection; (iv) perform a fine inspection of at least one page of the memory block based, at least in part, on contents of a second number of bytes of the at least one page, the second number of bytes being greater than the first number of bytes, the fine inspection validating the initial last good page identified by the coarse inspection; and (v) transmitting an index identifier of the last good page in response to the command to find the last good page.

The present application further describes a method for finding a last good page of a dirty block of non-volatile memory. The method includes identifying the dirty block within the non-volatile memory, the dirty block being a memory block that was subject to an interrupted input/output (I/O) operation, the interrupted I/O operation being one of a write operation and an erase operation. The method also includes performing a coarse inspection of one or more pages of the dirty block, each iteration of the coarse inspection including: (i) requesting a first number of bytes of a current page of the dirty block from the non-volatile memory; (ii) receiving contents of the first number of bytes from the non-volatile memory; and (iii) evaluating a state of the current page based, at least in part, on the contents of the first number of bytes. The method further includes determining an initial last good page of the dirty block based, at least in part, on the coarse inspection. The method also includes performing a fine inspection of at least one page of the dirty block based, at least in part, on contents of a second number of bytes of the at least one page of the dirty block, the second number of bytes being greater than the first number of bytes, the fine inspection validating the last good page identified by the coarse inspection. The method also includes initiating a remainder of the interrupted I/O operation starting after the last good page of the dirty block, the remainder including one of writing a remainder of data after the last good page and erasing pages after the last good page.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
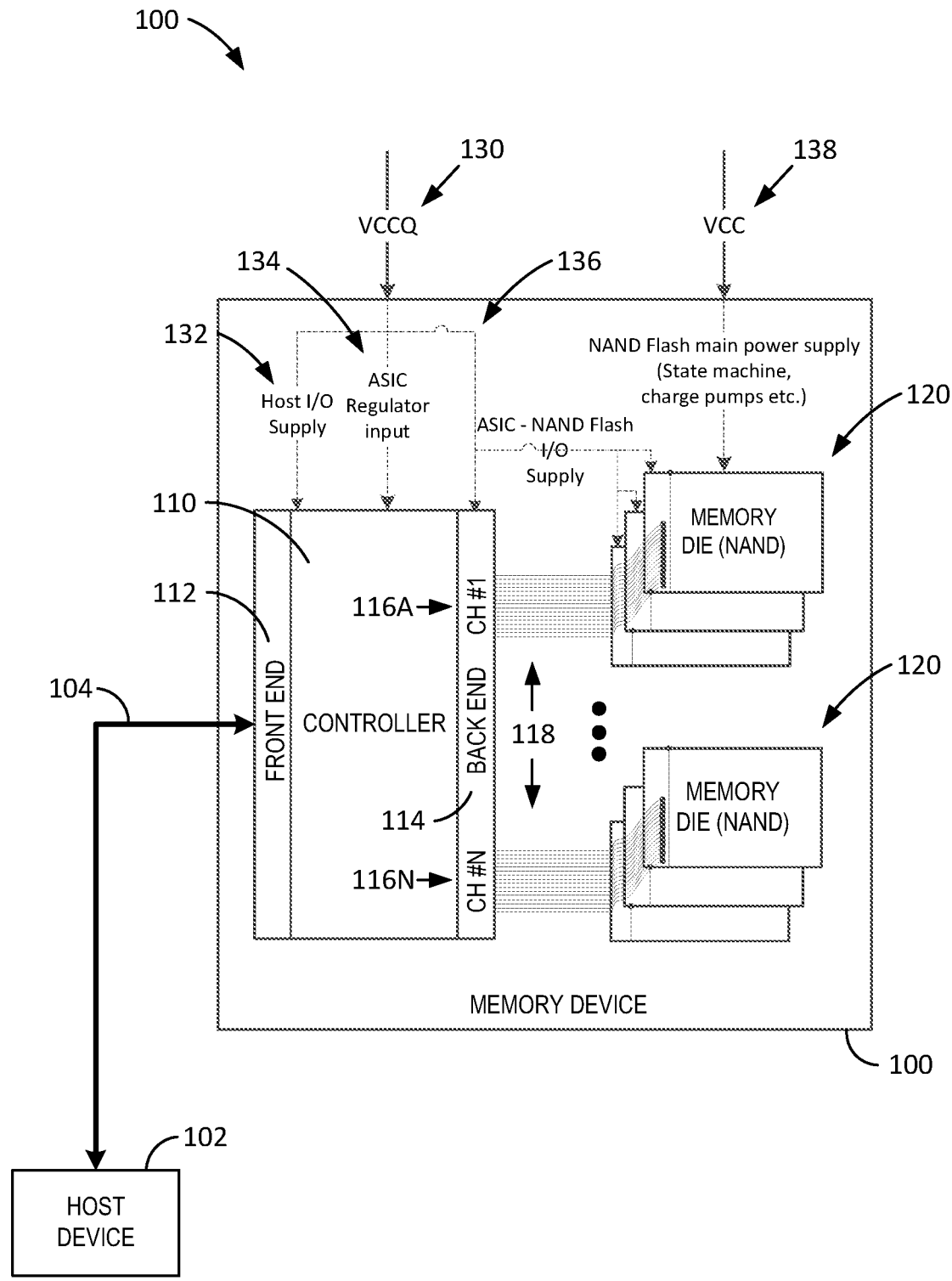
FIG. 1 is a component diagram of an example memory device.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

When a memory device, such as a NAND flash memory device of a user's smart phone, experience an ungraceful shutdown (e.g., due to power fluctuations or termination instructions from a host device), the memory device may have been interrupted during transitory operations, such as writes or erases of blocks of data. The memory device may, for example, have been in the process of writing pages of data to a particular memory block, but the interruption may cause a write abort for that memory block before the operation is completed. In such situations, upon the next start-up, the memory device may need to reconcile any open blocks (e.g., to perform operations starting at the next valid, non-corrupted page). As such, in dirty block situations where the last good page of a given open block is not known, it may be useful for the memory device to locate the LGP of each dirty block, or the last page of that memory block that was successfully programmed, as well as potentially whether there are corrupted pages to avoid (e.g., an unsuccessfully programmed page after the LGP). Once the LGP of a given dirty block is known, the memory device can perform operations on the next valid page after the LGP, for example, by starting at the next uncorrupted page after the LGP and continuing the operation through to the end of the memory block. However, known methods for finding the LGP of a dirty block typically require an amount of computational overhead (e.g., time to read and evaluate pages of each memory block) that may lead to an extensive dirty block cleanup cost before the memory device is again ready to enter normal operation.

Systems and methods are described herein for finding a last good page of dirty blocks of a non-volatile memory device. In an example, a controller of a memory device is configured to implement a two-stage analysis to find the LGP of dirty blocks. For each given dirty block, the memory device first performs a "coarse inspection," reading a small subset of bytes from the various pages of the dirty block to determine the LGP of the dirty block. Since the coarse inspection is only looking at a few bytes of the page (e.g., only 5 bytes, in one example), very little data is transferred between the memory die and the controller during this evaluation. However, due to the limited number of bytes being inspected during the coarse inspection, the coarse inspections may occasionally result in an erroneous determination of the LGP.

As such, after the coarse inspection finds a "tentative LGP" for the dirty block, the memory device may perform a "fine inspection" of one or two pages around the tentative LGP. The fine inspection uses significantly more bytes of those pages than the coarse inspection (e.g., 4 kilobytes, in one example). Since many more bytes are used in during the fine inspection, the confidence level of the LGP determination of the fine inspection is significantly higher when compared to the coarse inspection. If the fine inspection of the LGP identifies an error in the tentative LGP of the coarse inspection, the memory device may return back to coarse inspection and continue looking for the LGP. If the fine inspection verifies that the tentative LGP is the actual LGP, then the LGP is certified and, as such, may subsequently be used to identify the next valid, uncorrupted page is within the block, and thus where I/O operations can be performed.

This two-stage approach minimizes the amount of data transferred within the memory device during the coarse inspection, scaling up the data transfer only after a tentative LGP is identified. This method provides technical improvements to non-volatile memory by, for example, reducing the amount of time needed to resolve dirty blocks after a device restart, as well as reducing the amount of power consumed during such operation.

These various benefits and examples will be described in greater detail below with reference to FIG. 1-FIG. 6.

FIG. 1 is a component diagram of an example memory device 100. In this example, the memory device 100 includes a controller 110 (e.g., an application-specific integrated circuit (ASIC)) and one or more memory dies 120 (e.g., utilizing NAND-type flash memory or such). The controller 110 manages input/output (I/O) operations between the memory device 100 and a host device 102 (e.g., a computing device such as, for example, a mobile phone, a desktop computer, a server computing device, a removable storage card, or the like). The controller 110 includes a front end module (or just "front end") 112 that is configured to broker various communication operations between the host device 102 and the memory device 100 (e.g., receiving I/O commands from the host device 102, transmitting associated responses, and the like). The controller 110 also includes a back end module (or just "back end") 114 that is configured to communicate with the various memory dies 120 included in the memory device 100.

In this example, the memory dies 120 are non-volatile, NAND-type flash memory devices that store and retrieve host data (also referred to herein as "user data"). These memory dies 120 may include 2D or 3D (e.g., stacked) NAND non-volatile memory (e.g., as a 2D or 3D array of memory cells) that define a memory structure that is addressable by word lines using a decoder (e.g., row decoder) and by bit lines. Commands and data are transferred between the host device 102 and the controller 110 using a data bus 104, and between controller 110 and one or more of the memory dies 120 by way of lines 118. In one example, memory die 120 includes a set of input and/or output (I/O) pins that connect to lines 118.

The memory device 100 is powered by two power input lines, an I/O voltage (or VCCQ) 130 and a core voltage (or VCC) 138. The VCCQ 130 is used to provide a host I/O supply 132, an ASIC regulator input 134, and an ASIC-NAND flash I/O supply 136 to the controller 110. The VCC 138 provides a main power supply to the memory dies 130. In some examples, these inputs 130, 138 are provided by the host device 102, which may, as such, control power to the memory device 100.

In this example, the controller 110 logically organizes the NAND memory (e.g., all of the bits provided by cells of the memory dies 120) into memory blocks of a predetermined size (e.g., 4 megabytes (MBs), 16 MBs, 32 MBs, or the like). Each of these blocks includes multiple pages of a predetermined page size (e.g., 16 kilobytes (KBs), 32 KBs, 64 KBs, or the like), where all of the bits/cells for a particular page are all of the cells of a particular wordline. Such cells can be single-level cells (SLCs) (e.g., storing one bit per cell) or multi-level cells (MLCs) (e.g., storing more than one bit per cell). The inherent nature of NAND flash memory may include some limitations, such as performing an erase before writing/programming, data errors caused by write and read disturb, data retention errors, need for management of initial and runtime bad blocks, and other limitations known in the technology. In an example, a page is the smallest area of the memory dies 120 that supports a write operation and is performed on all of the memory cells on a particular wordline, a block is the smallest area of the memory dies 120 that supports an erase operation, and all properly erased bit store a value of '1' after the erase.

During operation, the memory device 100 receives I/O commands from the host device 102, such as read commands (e.g., commands for data already stored on the memory device 100), write commands (also sometimes referred to herein as "program commands" or "programming operations") (e.g., commands to write data to the memory device 100), and erase commands (e.g., commands to erase portions of data currently stored on the memory device 100), amongst others. The memory device 100, namely the controller 110, responds to each of these commands via subsequent operations conducted on the memory dies 120.

For write operations, the controller 110 and/or the host device 102 maintains and manages an open block table that identifies which memory blocks are currently in the midst of a write operation. For example, a particular memory block may be entered into the open block table when a write operation is initiated on that memory block, and that memory block may be cleared from the open block table when that operation is successfully completed. In some examples, the open block table may store LGP data (e.g., in clean graceful shutdown situations, where the memory system has time to store an LGP for open blocks).

During operation, the memory device 100 may receive a shutdown command from the host device 102 (e.g., in the case of a "graceful shutdown"). During such situations, the memory device 100 may be afforded time to finish any unfinished operations (e.g., complete any write operations on all of the open blocks or store LGPs for each partially completed operation in an open block) before the memory device 100 is shut down. In other situations, the memory device 100 may experience an event that interrupts the normal operation of the memory device 100 (e.g., a voltage drop on the power inputs 130, 138, or the like). In such "unplanned interruptions," write operations currently being performed on some or all of the open blocks may be in a partially performed (e.g., incomplete, or "dirty" state) or otherwise unknown or uncertain state (e.g., a partially programmed memory block). As such, when the memory device 100 reestablishes normal operation, all of the memory blocks that were open at the time of the interruption are in a dirty state. Accordingly, the example memory device 100 is configured to inspect each of these dirty blocks to find a last good page (also referred to herein as an FLGP operation/process) that was performed during the associated programming operation. Once the LGP of a particular dirty block is identified, the memory device 100 can continue completing the interrupted operation (e.g., starting the next valid, uncorrupted page after the LGP and continuing to the end of the memory block), or may be configured to perform any other programming operation starting at that next valid page (e.g., depending on host and firmware configurations, or the like).

Figure 2:
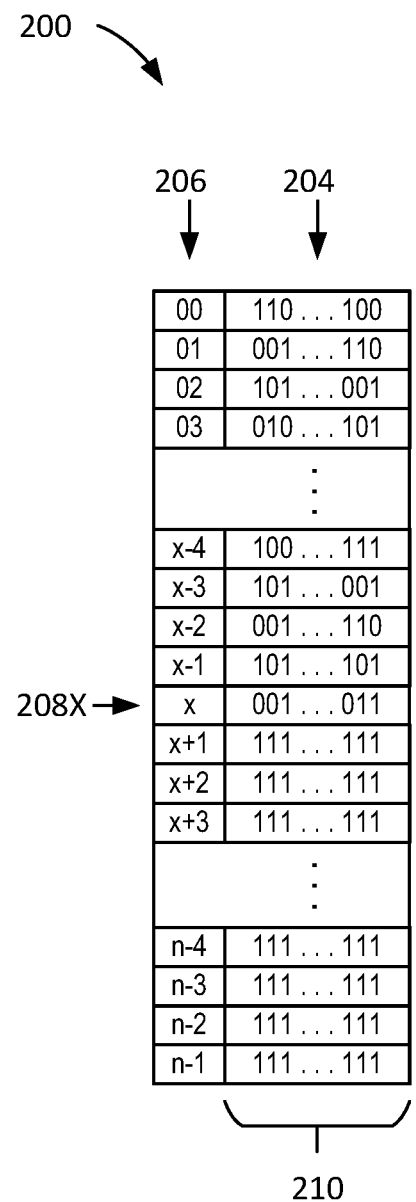
FIG. 2 illustrates a logical depiction of a dirty memory block that is managed by the memory device of FIG. 1.

FIG. 2 illustrates a logical depiction of a dirty memory block (or just "dirty block") 200 that is managed by the memory device 100 of FIG. 1. In this example, the memory device 100 was interrupted during a write (programming) operation on the dirty memory block 200. The dirty block 200 is illustrated with a number of rows 208, where each row represents a page of the associated block 200 (e.g., indexed between 0 and n−1), as well as a data column 204 and a page index column 208, where the page index column 206 represents a page number of the given row and the data column 204 represents the bits stored in that row (e.g., in a wordline associated with that row). In the example, the data 204 of each page is of a predetermined page size 210 (e.g., in number of bits).

In this example incomplete operation, the first x+1 pages of the block 200 have been successfully programmed. More specifically, block 200 has pages 0 to x as fully and successfully programmed (e.g., having various '0s' and '1s', based on the intended data being written to the block 200B), with the remaining pages x+1 to n−1 still containing unprogrammed, erased bits (e.g., having all bits set to '1'). It should be noted that, with the example memory device 100, a block 200 of data is fully erased before a new write operation is performed and, as such, a partially written/programmed block will have one or more of the last (e.g., highest indexed) pages 206 as being partially or fully erased (e.g., with all '1s'). In this example, row 208X (also referred to herein as "last good page 208X" or "LGP 208X") represents the "last good page" of this dirty block, with x being the row index of the LGP 208X, which may be any number in the index range (e.g., 0 to n−1) of the block 200. In some scenarios, there may be a border page (e.g., page x+1) that may be partially programmed (e.g., partially written or partially erased). Further, it should be noted that, in unplanned interruption scenarios, x is not known for any of the dirty blocks 200. As such, upon resumption of normal operations, the memory device 100 may inspect each of the dirty blocks 200 to determine which page of each block is the LGP 208X.

Several processing overhead issues are present when attempting to identify the LGP 208X of a given dirty block 200. For example, to find the LGP 208X, the memory device 100 may read all of the pages of the dirty block 200 and inspect the contents of each page 206 to determine the state of each of the pages 206. The memory device 100 may, for example, perform a bit count of some or all of the bits in a given page and use one or more bit count thresholds to determine whether a given page appears to be fully programmed, partially programmed/erased, or fully erased. In one example, the memory device may define a "not erased" (NER) threshold and a "truly erased" (TER) threshold, where each threshold represents a bit count (or percentage of bits) that is in a particular state (e.g., "0" or "1"). The NER threshold may be used to identify whether a particular page appears to be fully programmed or whether that page is a dirty page (e.g., only partially programmed and partially erased, or fully erased). The TER threshold may be used to identify whether a particular page appears to be fully erased or whether that page is at least partially programmed (e.g., either fully programmed or partially programmed and partially erased). In other words, and for example, a page that as a '0' count that is above the NER threshold may be considered fully programmed, a page that has a '0' count that is between the NER threshold and the TER threshold is considered partially programmed and partially erased (e.g., neither fully erased nor fully programmed), and a page that has a '0' count that is below the TER threshold is considered to be fully erased.

In this example, the NER threshold and TER threshold are defined in terms of a number of '0' bits or a percentage of '0' bits found within a particular page. For example, the memory device 100 may use the NER threshold to determine whether a particular page has or has not been fully programmed. In other words, if the number of '0' bits in the page is above the NER threshold (e.g., more than 40% '0s', or more than 6,554 '0s'), then the block is considered to be fully programmed. If the number of '0' bits in the page is below the TER threshold (e.g., less than 10% '0s', or less than 1,638 '0s'), then the block is considered to be fully erased. And if the number of '0' bits in the page is between the NER threshold and the TER threshold, then the page may be considered partially programmed and partially erased. While the NER and TER threshold examples are defined in terms of a number of '0s', it should be understood that complementary thresholds may instead be defined in terms of a number of '1s', reversing the range evaluation, and used to similar effect.

In some examples, a fully programmed range may be used in lieu of the NER threshold. For example, the memory device may be configured to scrambled and should have a relatively even spread between '0s' and '1s'. As such, a page may be considered fully programmed when the number of '0' bits is between 45% and 55%, and thus may be considered partially programmed when above this range or below this range but above the TER threshold, and still considered fully erased when the number of '0' bits is below the TER threshold.

Since write operations are performed sequentially by row 206 in these examples (e.g., starting with the lowest row index and proceeding to the highest row index), it is expected that the interrupted operation will have stopped at some row, thus having successfully programmed data on some number of rows (e.g., rows 0 to x), but not having yet fully performed a successful write of data on the remaining rows (e.g., rows x+1 to n), where x can be any index value between 0 and n−1. In these examples, and for purposes of discussion, row 208X is considered the last good programmed row.

As such, the memory device 100 may be configured to perform a sequential search for the LGP 208X by, for example, starting at the first row (e.g., the row 208 of index 0), reading the entire data 204 for that row 208, and evaluating the data 204 for that row 208 (e.g., using the NER threshold discussed above) to determine whether the current row had been fully programmed. Accordingly, the memory device 100 may continue with this process, continuing to similarly evaluate the next rows 208 until a dirty page is found (e.g., at row x+1, as either a fully erased page or a partially programmed page), thus indicating that the prior page (e.g., at row x) was the LGP 208X. The memory device 100 may also identify the next valid, uncorrupted page after the LGP 208X (e.g., the next "truly erased page," to use as the page at which to start further programming operations). For example, the page x+1 may have been corrupted by an incomplete programming operation, and thus may not be usable for subsequent programming operations, leaving page x+2 as the next valid page from which to perform subsequent programming operations.

However, this sequential process presents several performance considerations that can be improved. First, since inspection of the contents of the dirty block 200 (to some degree) is needed to find the LGP 208X, at least some of the data of the block 200 is read (e.g., sensed by the memory dies 120) and sent back to the controller 110 (e.g., via lines 118) during the evaluation of each dirty block 200. If the full page of data (e.g., all 16 KB) is used for the evaluation, and if there are x+1 pages that are read before finding the LGP 208X, then at least x+1 pages need to be sensed and transferred from the memory die 120 to the controller 110 (e.g., via lines 118). In average case situations, such operations would transfer 16 KB*(x+1) pages of data for each dirty block. In worst case situations, such operations would transfer the full block of data from the die 120 back to the controller 110. Further, each of these x+1 pages are also evaluated by the controller 110, thus adding computational time to the process. Such read, data transfer, and row evaluation operations use time, during device startup, that may delay the memory device 100 from commencing normal operations. Further, each of these operations are also power consuming, which adds to the power draw of the memory device 100 during startup. There may be many situations or architectures in which power consumption of the memory device is a significant concern (e.g., mobile devices or other such battery-operated devices). As such, limiting power consumption during such operations can lower the power profile and consumption totals of the device.

As such, it would be beneficial to limit the amount of data transferred between the memory die 120 and controller 110 during inspection of each dirty block, as well as limit the amount of computation performed during evaluation of each row inspected.

Figure 3:
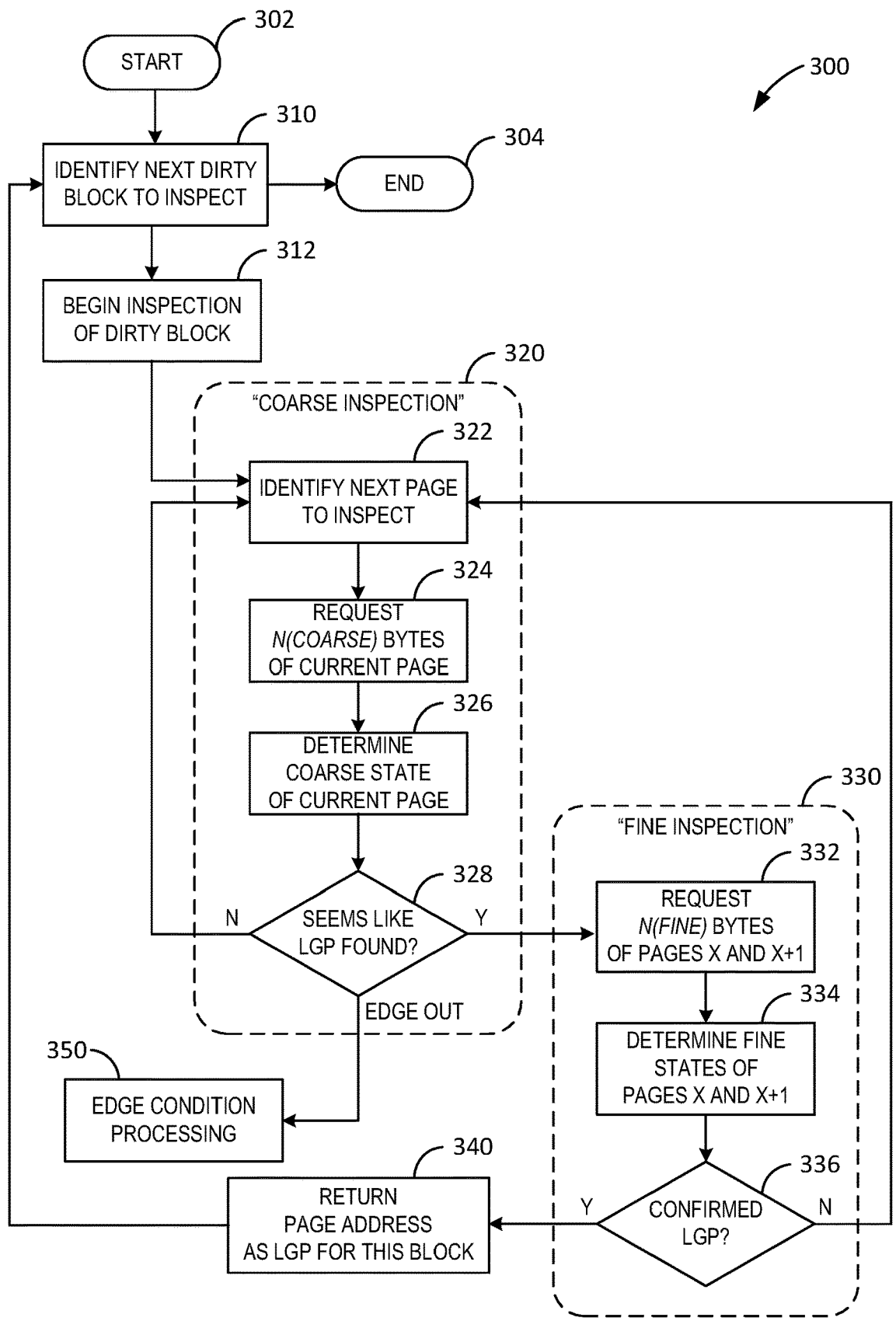
FIG. 3 is a flowchart of an example method for identifying a last good page of a dirty block that improves performance.

FIG. 3 is a flowchart of an example method 300 for identifying a last good page 208X of a block that improves performance. In some examples, the block may be an open block, a suspected dirty block 200, or the like. In the example, the method 300 is performed by the memory device 100 (e.g., by the controller 110 in conjunction with the memory dies 120 upon resumption of normal operations after a power fluctuation). For purposes of explanation, the example method 300 is described here with respect to the memory device 100 of FIG. 1 and the example blocks 200 of FIG. 2, and the memory device 100 may be installed within or otherwise a part of the host device 102. Further, while other sizes are possible, in these examples, a page size of 16 KB (e.g., 16,384 bits) and a block size of 256 pages is used (e.g., 4 MB total block size), and these sizes may also include error correction or parity bits (e.g., either included in the 16 KB, or with a page size of 16 KB+parity bits).

In this example, the method 300 begins 302 by identifying a block 200 to inspect at operation 310. This block may be identified by the controller 110 (e.g., via an open block table internally maintained by the memory device 100), or may be received by the controller 110 from the host device 102. Further, for a given block 200, the type of interrupted operation (e.g., an interrupted write) is also identified at this operation 310. When there are no blocks to process, then the method 300 terminates inspection of open blocks at end 304. At operation 312, the inspection of the current block 200 begins.

The present disclosure recognizes that it may be feasible to evaluate the state of each page using less than all of the bits during the inspection, with some confidence level. Consider evaluating a given page 208 using only a particular number of bytes, N, of that page, and where the probability of a particular cell to be programmed (e.g., zero) in an erased page is $p_E$, and the probability of a cell to be programmed (e.g., zero) in a page after write-abort is $p_{WA}$. As such, the number of programmed cells in an erased page is equal to $N*p_E$, and the number of programmed cells in a page after write-abort is $N*p_{WA}$. Accordingly, standard deviations for each may be defined as:

$$\sigma_E = \sqrt{N*p_E*(1-p_E)}, \text{ and}$$

$$\sigma_{WA} = \sqrt{N*p_{WA}*(1-p_{WA})}.$$

In order to distinguish between an erased page and a page with write-abort, a value for N may be identified, with a confidence level, C, such that:

$$(N*p_E)+C*\sqrt{N*p_E*(1-p_E)} < (N*p_{WA})-C*\sqrt{N*p_{WA}*(1-p_{WA})}, \quad (1)$$

with a miss detection of Qfunc(C). As such, the threshold for declaring a page to be fully erased is when a number of zeros is smaller than:

$$(N*p_E)+C*\sqrt{N*p_E*(1-p_E)}.$$

For example, assuming $p_E=10^{-4}$, and $p_{WA}=10^{-3}$, and C=4, for N=4,576 bytes (e.g., 36,408 cells), then:

$$(N*p_E)+C*\sqrt{N*p_E*(1-p_E)} = 11.3137, \text{ and}$$

$$(N*p_{WA})-C*\sqrt{N*p_{WA}*(1-p_{WA})} = 12.4183.$$

The inequality (1) holds for N>4,275 bytes, but for smaller N, the inequality (1) does not hold. The miss detection probability in this example is Qfunc(4)=3.1671e-05.

Consider when the goal is to get an approximate indication of pages that are not fully programmed (e.g., not partially programmed or erased). As such, using this approximation with a much smaller data chunk length may be used for making the FLGP decisions, and thus also limit the amount of data transferred between the memory die 120 and the controller 110. For example, consider if $p_E=0.1$ (e.g., representing a TER or WA page which should have less than 10% '0s'), and if $p_{WA}=0.5$ (e.g., representing a programmed page with 50% '0s'), and C=3 (e.g., corresponding to ~1/1,000). As such, in light of these values in the inequality (1), only N=5 bytes is sufficient to distinguish between 10% '0s' and 50% '0s' with a probability of ~1/1,000. In contrast, the prior example distinguished between 0.1% '0s' and 0.01% '0s' with a probability of ~1/300,000 using N=4,275 bytes.

Accordingly, in light of the above analysis, the example method 300 performs inspection of each open block 200 via a two stage approach, namely a coarse inspection stage (or just "coarse inspection") 320 and a fine inspection stage (or just "fine inspection") 330. Each of these two stages 320, 330 has an associated chunk size, in a number of bytes or bits (or, similarly, a percentage of bytes or bits in a page), that defines how many bytes of a given page are inspected. These two chunk sizes are referred to herein as a "coarse chunk size" ("N(coarse)") and a "fine chunk size" ("N(fine)") where the fine chunk size is larger than the coarse chunk size. In some examples, the coarse chunk size may be N(course)=5 bytes and the fine chunk size may be N(fine)=4,275 bytes. These chunk sizes, N, represent a number of bytes/bits of a given page 208 that are inspected during page evaluations (e.g., using the NER/TER thresholds and process discussed above).

More specifically, during coarse inspection 320, pages 208 are evaluated using the coarse chunk size, while during fine inspection 330, pages 208 are evaluated using the fine chunk size. The coarse inspection stage 320 thus represents an evaluation that uses fewer bytes of the page 208, but with less confidence in the evaluation, and the fine inspection stage 330 represents a more confident evaluation that uses more bytes of the page 208. As such, the method 300 performs coarse evaluation 320 (e.g., using fewer bytes of the page) until an initial (e.g., tentative or preliminary) LGP 208X is identified, then shifts to fine evaluation 330 (with more bytes of the page) to establish the LGP 208X with greater confidence.

In the example, coarse inspection 320 begins a first iteration of evaluation by identifying a next page to inspect at operation 322. In some examples, the method 300 may perform a sequential evaluation of each page 208 (e.g., starting from index=0 and incrementing to the next page during each subsequent iteration). In other examples, the method 300 may perform a binary search evaluation of the pages 208 of the block 200. For example, selecting the first page 208 to evaluate as page index (n-1)/2 (e.g., the middle page of the block), then moving up or down to the middle of the remainder of the block (e.g., based on the state of the evaluated state of the page), and so forth until the LGP 208X is identified.

At operation 324, the memory device 100 (e.g., the controller 110) requests N(coarse) bytes from the current page of the block 200 from the associated memory die 120. In some examples, the controller 110 may provide a logical address range for which bytes to read from the memory die 120. The memory die 120 may translate those logical addresses to physical addresses for each of the bytes or bits.

It should be understood that the physical addresses of particular logical bytes/bits may be contiguously or non-contiguously stored within the memory die 120, depending on the architecture. In other words, a logical address range of bytes may map to physical cell addresses within the memory die that are dispersed from each other (e.g., depending on the architecture, logical to physical mapping, and such). In some examples, the controller 110 may randomize which particular N logical bytes are requested from the memory die 120 (e.g., to ensure a dispersed sample of bytes/bits for the given page).

At operation 326, the memory device 100 determines the state of the current page based on the N(coarse) bytes received from the memory die 120 (referred to herein as the "coarse state"). More specifically, and as described above, the memory device 100 counts the number of '0s' and uses the NER threshold versus the number of '0s' appearing in the N(coarse) bytes to determine whether the page appears to be fully programmed or dirty (e.g., where dirty indicates either partially programmed/partially erased or fully erased). If the number of '0s' is above the NER threshold, then the coarse state of the current page is determined to be "fully programmed." Otherwise, the page is determined to be a dirty page.

At operation 328, the memory device 100 evaluates or determines whether the LGP 208X appears to have been found during this coarse inspection 320. In sequential search, the LGP 208X is identified when the state of the current page (e.g., page x+1) is dirty, where the state of the prior page (e.g., page x) is fully programmed. For example, the LGP 208X is identified when the coarse state of the previous page is "fully programmed" but the coarse state of the current page is either "partially programmed/erased" or "fully erased" (e.g., based on the NER threshold). In binary search, the search converges through a different process, but does converge to a situation where the state of the contiguous pages x and x+1 have been determined. And similar to the serial example, the LGP 208X is identified when the coarse state of a page (e.g., page x being "fully programmed"), and when the subsequent adjacent page (e.g., page x+1) is dirty.

If, at operation 328 during the iteration for the current page, the LGP 208X has not yet been identified, then coarse inspection continues back to operation 322 (e.g., incrementing to the next page in the case of sequential search, or iterating to the next middle in the case of binary search, or such). In converged cases where no LGP 208X has been identified (e.g., when no dirty rows can be identified), then coarse inspection 320 may be terminated and other edge condition processing may be performed at operation 350. For example, in a sequential search, if all of the pages 208 are evaluated during coarse inspection 320 and all pages 208 appear to be "fully programmed", then the memory device 100 may consider the block 200 as having been successfully programmed and may mark the block as such. Or if all of the pages 208 are evaluated as dirty during coarse inspection 320, then the memory device may evaluate the first page to evaluate whether there is a partially programmed page, or otherwise identify the block as fully erased. In other examples, the memory device 100 may presume that some error had occurred during coarse inspection 320 and may revert to fine inspection 330 (e.g., performing a full fine evaluation of the block, or performing a reverse sequential evaluation starting at the last page x−1 of the block and stepping sequentially up the block to confirm, using N(fine) bytes for each page, that there are really no differing rows).

If, at operation 328, the LGP 208X seems to have been identified by the coarse inspection 320, then the memory device 100 steps into fine inspection 330. At this stage where fine inspection 330 is initiated, the coarse inspection 320 has found a page x that has a fully programmed state and a page x+1 that has a dirty state, and this finding will be confirmed by the fine inspection 330. More specifically, in the example, the memory device 100 requests N(fine) bytes of the two pages x and x+1 at operation 332. At operation 334, the memory device 100 determines the state of these two pages based on the N(fine) bytes of each (referred to herein as the "fine state") (e.g., similar to operation 326, just with a greater number of bytes). At test 336, the memory device 100 evaluates the fine states of pages x and x+1 and confirms whether the fine states recognize the finding of the LGP 208X. In other words, the memory device 100 determines whether page x still appears to be fully programmed, based on the NER threshold as compared to the N(fine) bytes of page x, and that page x+1 appears to be dirty, based on the NER threshold as compared to the N(fine) bytes of page x+1. The finding of the LGP 208X is confirmed when the fine state of page x is "fully programmed" and the fine state of page x+1 is stale.

In cases where the LGP 208X is not confirmed by the fine inspection 330 at test 336, then this confirms that some evaluation in the coarse inspection 320 has erred. In the example, the method 300 may return to continue coarse inspection 320 (e.g., setting the coarse state of two pages evaluated by the fine inspection 330 to the fine states, thus overwriting some erroneous coarse state(s) with the more reliable fine states). In situations where both fine states indicate that the pages had been fully programmed, then the method 300 continues back to coarse inspection 320, continuing working down the page list. In situations where both fine states indicate that both pages were dirty, then the coarse inspection may reverse direction and instead work up the list, staying in fine inspection 330 until the LGP is found. In some examples, if the coarse inspection 320 fails, then the method 300 may continue with only fine inspection 330, still identifying the next page (e.g., working either up or down, depending on the indicated direction), but always using N(fine) bytes for the remainder of the evaluation of the block 200. In some examples, either or both of the NER and TER thresholds may be dynamically adjusted in error conditions (e.g., up or down by a predetermined percentage), and independently or together for coarse inspection or fine inspection. In some examples, either or both of the N(coarse) and N(fine) value may be dynamically adjusted in error conditions (e.g., increasing the number of bytes in either, to get a more confident result).

When the LGP 208X is successfully confirmed by the fine inspection 330, then the page index of the LGP 208X is returned for this block 200 at operation 340 and the method 300 may return to operation 310 to continue inspection of the next block 310. In some examples, operation 340 includes finding the next valid, uncorrupted page after the LGP 208X. For example, if the next page after the LGP 208X (e.g., page x+1) has a state of partially programmed (e.g., not truly erased, as compared to the TER threshold), then that page may not be usable for subsequent programming operations. As such, the memory device 100 may be configured to identify the following page (e.g., page x+2) as the next valid page after the LGP 208X. In some examples, the memory device 100 may inspect that page (e.g., as an additional check) by, for example, inspecting N(fine) or N(coarse) bytes of page x+2 and confirm whether or not the bit count is under the TER threshold (e.g., indicating a truly erased page), and may continue to subsequent page(s) until the first truly erased page is found.

In some examples, the memory device 100 may further evaluate the states of pages x+1 and x+2 for more specific detail regarding their dirty state. In the example, the page x+1 is now known to be dirty, and the page x+2 is presumed to be dirty, but it is not yet known whether the page x+1 is fully erased or partially programmed. As such, the memory device 100 may evaluate the N(fine) bits of page x+1 against the TER threshold to determine whether the page is fully erased. If the '0' count of page x+1 is below the TER threshold, then page x+1 may be considered fully erased, and the method may continue onto the next open block. However, if page x+1 is above the TER threshold, then page x+1 may be considered partially programmed (e.g., not fully erased). This data may be provided back to the memory device 100 for further action, as the memory device 100 may not be able to erase a single page, but may not be able to reprogram the page without the page being in a fully erased state. In some examples (e.g., when page x+1 is identified as a partially programmed page), then the memory device 100 may also perform an inspection on the next page as well, namely page x+2. The memory device 100 may request N(fine) bytes of page x+2 and evaluate those bytes against the TER threshold to confirm whether page x+2 is fully erased. In situations where page x+1 is partially programmed and page x+2 is fully erased, this is the expected condition, and the process may continue on. However, if page x+2 is not found to be fully erased, then this is an error condition, and this process may continue to inspect this block as a dirty block 200.

While not included here, as this method 300 is focused on an improved, novel process for identifying the LGP 208X of a block 200, it should be understood that the memory device 100 may use the LGP 208X of each block 200 to continue programming operations on this block 200.

As such, the two-stage approach of the example method 300 shown in FIG. 3 provides various computational benefits. For example, in comparison to a full sequential evaluation of the pages 208 of a block 200 (e.g., inspecting the full page size of each page), the pages 208 inspected during the coarse inspection 320 only perform a transfer of N(coarse) bytes (e.g., 5 bytes) rather than the full 16 KB (+parity) bytes of the full sequential evaluation. This minimal transfer during coarse inspection saves power usage on the memory device, reduces computational complexity on the controller 110, and bandwidth usage on the channels 118 between the memory dies 120 and the controller 110, bumping up to N(fine) bytes only when ready to verify the results of the coarse inspection 320. Such technical improvements also reduce the processing time to identify and resolve open blocks during restart of the memory device 100, thus allowing the memory device 100 to be brought into normal operation in a shorter time.

In the example shown in FIG. 3, the various operations are performed by the controller 110 in conjunction with responsive operations by the memory dies 120. In some examples, some of the operations of the method 300 may instead be performed on the memory dies 120. In one example, the operations of the coarse inspection 320 may be performed by the controller (e.g., transferring only N(coarse) bytes from the memory dies 120 to the controller 110) and the operations of the fine inspection 330 may be performed on the memory dies 120 (e.g., by way of an onboard ASIC or similar component configured to evaluate state of pages 208 of the memory to confirm LGP 208X using N(fine) bytes, up to and including the full page size). In some examples, all of the coarse inspection 320 operations and fine inspection 330 operations may be performed onboard the memory dies 120 (e.g., where the controller 110 may send a FLGP command to the memory die 120 that identifies the block(s) of interest, and receive the LGP 208X from the memory die 120 in response).

In some examples, the memory device 100 may perform a single-tier approach using only fine inspection 330. For example, the memory device 100 may identify an N(fine) of less than the full page size, such as N(fine)=4 KB, and may perform the method 300 using only the fine inspection 330 with N(fine) bytes evaluated for each page. Such a single-tier approach provides technical improvements over full evaluation, and with a confidence level greater than the two-tier approach, but at the cost of more computational resources (e.g., processing, bandwidth) than the two-tier approach.

In some examples, N(coarse) may be any value below 4 KB, below 2 KB, or below 1 KB, or any value below N(fine), below one half of N(fine), or below one quarter of N(fine). In some examples, N(fine) may be the full page size, any value between the page size and one half or one quarter of the page size, 4 KB, 8 KB, or 16 KB.

In some examples, the methods described herein may be parallelized in certain aspects. For example, where a particular channel 116 may only support one transfer at a time (e.g., for N(coarse) or N(fine) bytes of a particular block), the memory device 100 may have open blocks on dies 120 on different channels 120, and thus may concurrently similarly process blocks on other channels 116. Further, during coarse inspection 320 of blocks sharing the same channel 116, the transfer of short N(coarse) byte chunks for multiple blocks may be interleaved, thus allowing at least some concurrent processing.

It should be noted that, while the above examples presume a memory device that performs programming operations sequentially (e.g., starting from page 0 and moving to page n−1, or vice versa), and thus describe search operations as such, the example systems and methods described herein can be applied to memory systems that use other (e.g., non-sequential) programming schemes. In other words, the identification of the next page to inspect as described in operation 322 may be modified to follow whatever technique is used to program blocks 200, thus allowing this method to traverse the pages of each block in a way that is reflective of the underlying programming technique.

Figure 4:
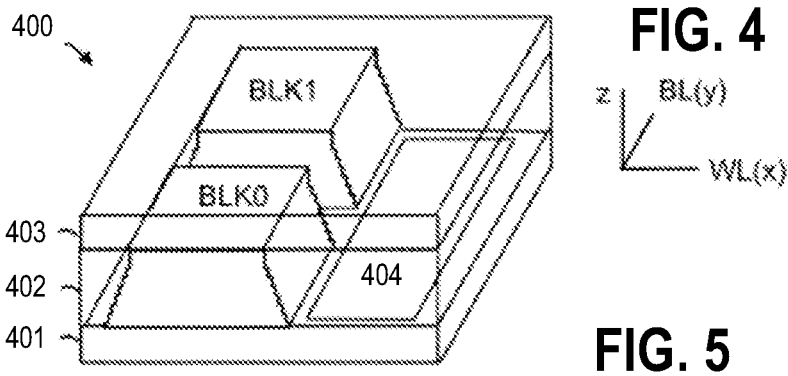
FIG. 4 is a perspective view of a storage system that includes three-dimensional (3D) stacked non-volatile memory.
Figure 5:
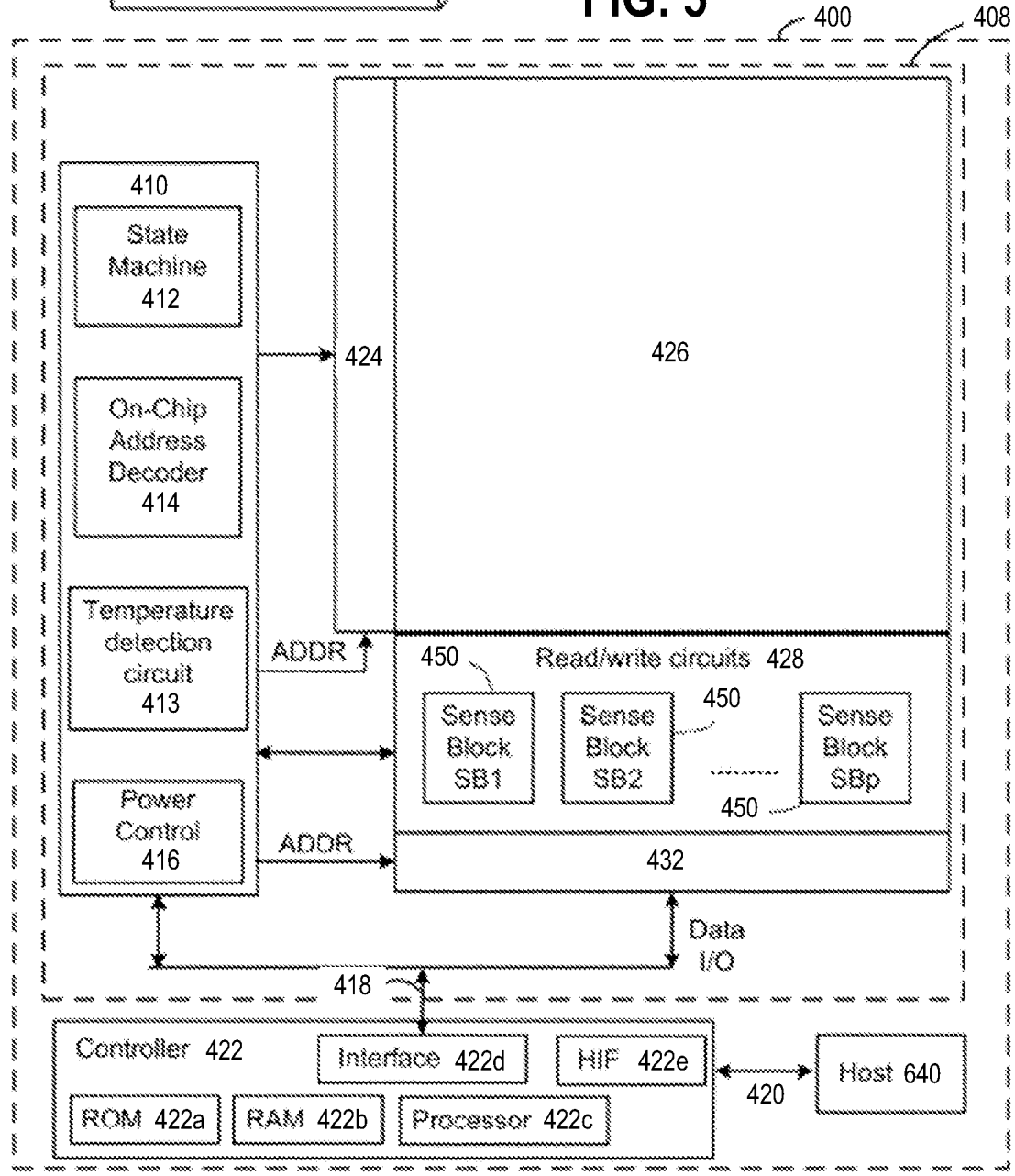
FIG. 5 is a functional block diagram of an example storage device, such as the 3D stacked non-volatile storage device of FIG. 4.
Figure 6:
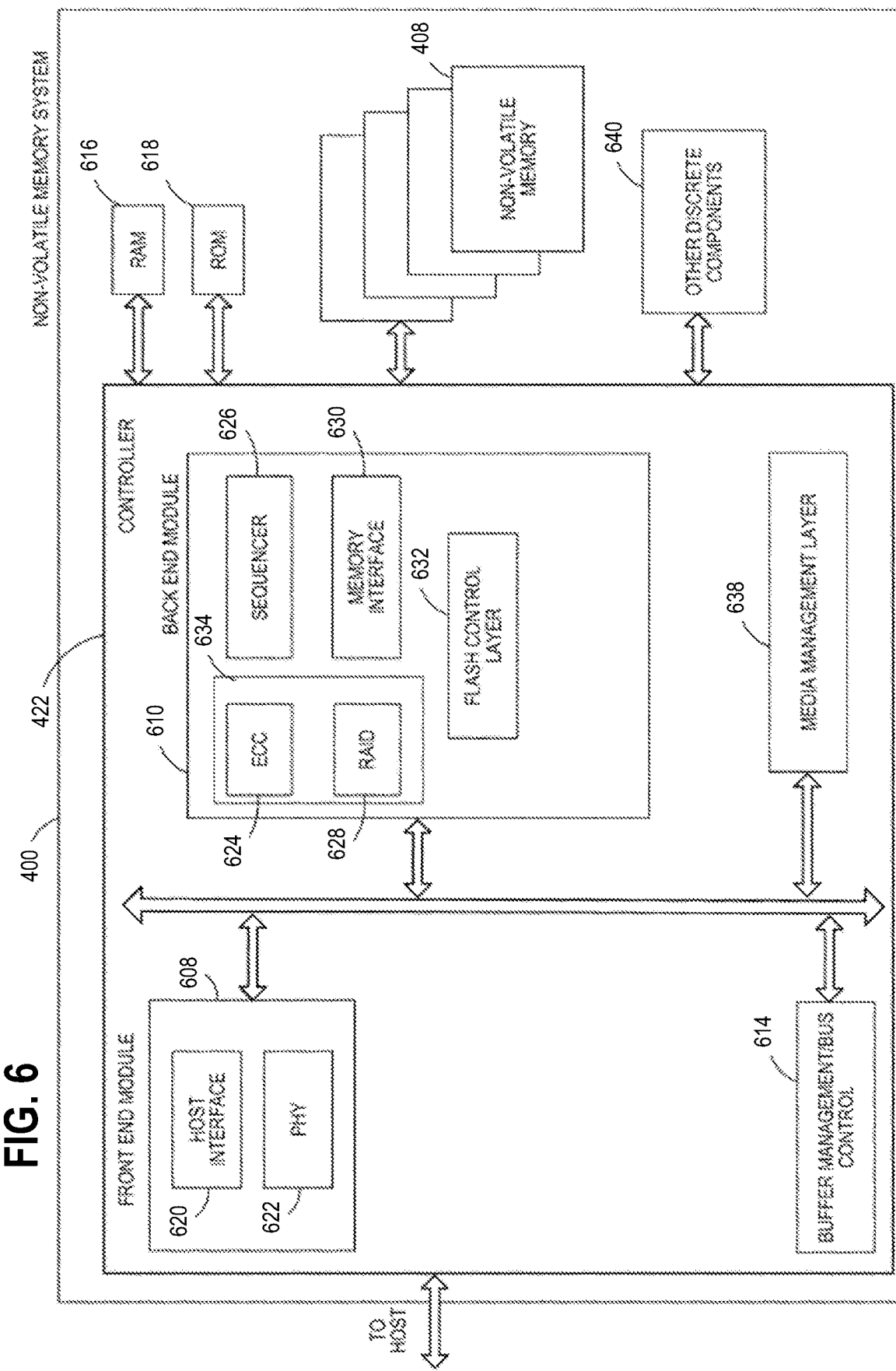
FIG. 6 is an example block diagram of example storage system, depicting more details of the controller.

FIGS. 4-6 describe an example of a storage system that may be similar to the memory device 100 of FIG. 1, components of which may implement the method 300 of FIG. 3. In some examples, the controller 422 is similar to the controller 110 of FIG. 1 and the memory dies 408 are similar to the memory dies 120 of FIG. 1. FIG. 4 is a perspective view of a storage device 400 that includes three-dimensional (3D) stacked non-volatile memory. The storage device 400 includes a substrate 401. On and above the substrate are example blocks of memory cells, including BLK0 and BLK1, formed of memory cells (non-volatile memory elements). Also on substrate 401 is peripheral area 404 with support circuits for use by the blocks. Substrate 401 can also carry circuits under the blocks, along with one or more lower metal layers which are patterned in conductive paths to carry signals of the circuits. The blocks are formed in an intermediate region 402 of the storage device 400. In an upper region 403 of the storage device 400, one or more upper metal layers are patterned in conductive paths to carry signals of the circuits. Each block of memory cells includes a stacked area of memory cells, where alternating levels of the stack represent word lines. While two blocks are depicted as an example, additional blocks can be used, extending in the x- and/or y-directions.

In one example implementation, the length of the plane in the x-direction represents a direction in which signal paths for word lines extend (e.g., a word line or drain-end select gate (SGD) line direction) and the width of the plane in the y-direction represents a direction in which signal paths for bit lines extend (e.g., a bit line direction). The z-direction represents a height of the storage device 400.

FIG. 5 is a functional block diagram of an example storage device, such as the 3D stacked non-volatile storage device 400 of FIG. 4. The components depicted in FIG. 5 are electrical circuits. Storage device 400 includes one or more memory dies 408. Each memory die 408 includes a three-dimensional memory structure 426 of memory cells (e.g., a 3D array of memory cells), control circuitry 410, and read/write circuits 428. In other examples, a two-dimensional array of memory cells can be used. Memory structure 426 is addressable by word lines using a decoder 424 (e.g., row decoder) and by bit lines using a column decoder 432. The read/write circuits 428 include multiple sense blocks 450 including SB1, SB2 . . . , SBp (e.g., sensing circuitry) and allow a page of memory cells to be read or programmed in parallel. In some systems, a controller 422 is included in the same storage device 400 (e.g., a removable storage card) as the one or more memory dies 408. In some examples, the controller is formed on a die that is bonded to a memory die, in which case each memory die has its own controller. In other examples, a controller die controls all of the memory dies. Commands and data are transferred between the host 640 and controller 422 using a data bus 420, and between controller 422 and one or more of the memory dies 408 by way of lines 418. In one example, memory die 408 includes a set of input and/or output (I/O) pins that connect to lines 418.

Memory structure 426 may include one or more arrays of memory cells, including a 3D array. The memory structure may include a monolithic 3D memory structure in which multiple memory levels are formed above (e.g., and not in) a single substrate, such as a wafer, with no intervening substrates. The memory structure may include any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 410 cooperates with the read/write circuits 428 to perform memory operations (e.g., erase, program, read, and others) on memory structure 426, and includes a state machine 412, an on-chip address decoder 414, and a power control module 416. The state machine 412 provides chip-level control of memory operations. Temperature detection circuit 413 is configured to detect temperature, and can be any suitable temperature detection circuit known in the art. In one example, state machine 412 is programmable by the software. In other examples, state machine 412 does not use software and is completely implemented in hardware (e.g., electrical circuits). In one example, control circuitry 410 includes registers, ROM fuses, and other devices for storing default values such as base voltages and other parameters.

The on-chip address decoder 414 provides an address interface between addresses used by host 640 or controller 422 to the hardware address used by the decoders 424 and 432. Power control module 416 controls the power and voltages supplied to the word lines and bit lines during memory operations. It can include drivers for word line layers in a 3D configuration, select transistors (e.g., SGS and SGD transistors) and source lines. Power control module 416 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 410, state machine 412, decoders 414/424/432, temperature detection circuit 413, power control module 416, sense blocks 450, read/write circuits 428, and controller 422 can be considered one or more control circuits, or a managing circuit, that performs some or all of the functions described herein.

Controller 422, which in one example is an electrical circuit that may be on-chip or off-chip, may include one or more processors 422c, ROM 422a, RAM 422b, memory interface 422d, and host interface 422e, all of which are interconnected. One or more processors 422c is one example of a control circuit. Other examples can use state machines or other custom circuits designed to perform one or more functions. Devices such as ROM 422a and RAM 422b may include code such as a set of instructions, and the processor 422c may be operable to execute the set of instructions to provide some or all of the functionality described herein. Alternatively or additionally, processor 422c may access code from a memory device in the memory structure, such as a reserved area of memory cells connected to one or more word lines. Memory interface 422d, in communication with ROM 422a, RAM 422b, and processor 422c, is an electrical circuit that provides an electrical interface between controller 422 and memory die 408. For example, memory interface 422d can change the format or timing of signals, provide a buffer, isolate from surges, latch I/O, and so forth. Processor 422c may issues commands to control circuitry 410, or any other component of memory die 408, using memory interface 422d. Host interface 422e, in communication with ROM 422a, RAM 422b, and processor 422c, is an electrical circuit that provides an electrical interface between controller 422 and host 640. For example, host interface 422e can change the format or timing of signals, provide a buffer, isolate from surges, latch I/O, and so forth. Commands and data from host 640 are received by controller 422 by way of host interface 422c. Data sent to host 640 are transmitted using host interface 422e.

Multiple memory elements in memory structure 426 may be configured so that they are connected in series or so that each element is individually accessible. By way of non-limiting example, flash memory devices in a NAND configuration (e.g., NAND flash memory) typically contain memory elements connected in series. A NAND string is an example of a set of series-connected memory cells and select gate transistors.

A NAND flash memory array may be configured so that the array includes multiple NAND strings, where a NAND string includes multiple memory cells sharing a single bit line and that are accessed as a group. Alternatively, memory elements may be configured so that each element is individually accessible (e.g., a NOR memory array). NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

Some three-dimensional memory arrays are arranged so that memory cells occupy multiple planes or multiple memory device levels, thereby forming a structure in three dimensions (e.g., in the x, y, and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

By way of non-limiting example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

FIG. 6 is a block diagram of example storage device 400, depicting more details of controller 422. In one example, the system of FIG. 6 is a solid-state drive (SSD). As used herein, a flash memory controller is a device that manages data stored on flash memory and communicates with a host, such as a computer or other electronic device. A flash memory controller may have various functionalities in addition to the specific functionalities described herein. For example, the flash memory controller may format the flash memory to ensure the memory is operating properly, map out bad flash memory cells, and allocate spare memory cells to be substituted for future failed memory cells. Some part of the spare memory cells can be used to hold firmware to operate the flash memory controller and implement other features. During operation, when a host reads data from or writes data to the flash memory, the host will communicate with the flash memory controller. If the host provides a logical address to which data is to be read/written, the flash memory controller may convert the logical address received from the host to a physical address in the flash memory. Alternatively, in some examples, the host may provide the physical address. The flash memory controller may also perform various memory management functions such as, but not limited to, wear leveling (e.g., distributing writes to avoid wearing out specific blocks of memory that may otherwise be repeatedly written to) and garbage collection (e.g., after a block is full, moving only the valid pages of data to a new block, so the full block can be erased and reused). Non-volatile memories other than flash may have non-volatile memory controllers that are similar to flash memory controllers.

The communications interface between controller 422 and non-volatile memory dies 408 may be any suitable flash interface, such as toggle mode. In one example, storage device 400 may be a card based system, such as a secure digital (SD) or a micro secure digital (micro-SD) card. In another example, storage system 400 may be part of an embedded storage system. For example, the flash memory may be embedded within the host, such as in the form of a solid-state disk drive installed in a personal computer.

In some examples, storage system 400 includes a single channel between controller 422 and non-volatile memory dies 408. However, the subject matter described herein is not limited to having a single memory channel. For example, in some storage system architectures, two, four, eight, or more channels may exist between the controller and the memory dies 408 (e.g., depending on controller capabilities). In any of the examples described herein, more than a single channel may exist between the controller and the memory dies 408, even if a single channel is shown in the drawings.

As depicted in FIG. 6, controller 422 includes a front-end module 608 that interfaces with a host, a back-end module 610 that interfaces with the one or more non-volatile memory dies 408, and various other modules that perform functions which are described herein.

The components of controller 422 depicted in FIG. 6 may take the form of a packaged functional hardware unit (e.g., an electrical circuit) designed for use with other components, a portion of a program code (e.g., software or firmware) executable by processing circuitry that performs a particular function or related functions, or a self-contained hardware or software component that interfaces with a larger system. The controller 422 may include an application-specific integrated circuit (ASIC), a field programmable gate array (FPGA), a circuit, a digital logic circuit, an analog circuit, a combination of discrete circuits, gates, or any other type of hardware or combination thereof. The architecture depicted in FIG. 6 is one example implementation that may or may not use the components of controller 422 depicted in FIG. 5 (e.g., RAM, ROM, processor, interface).

Referring again to modules of the controller 422, a buffer manager/bus controller 614 manages buffers in random access memory (RAM) 616 and controls the internal bus arbitration of controller 422. A read-only memory (ROM) 618 stores system boot code. Although illustrated in FIG. 4 as located separately from the controller 422, in other examples, one or both of the RAM 616 and ROM 618 may be located both within the controller 422 and outside the controller 422. Further, in some implementations, the controller 422, RAM 616, and ROM 618 may be located on separate semiconductor dies.

Front-end module 608 includes a host interface 620 and a physical layer interface 622 (PHY) that provide the electrical interface with the host or next level storage controller. The choice of the type of host interface 620 can depend on the type of memory being used. Examples of host interfaces 620 include, for example, SATA, SATA Express, SAS, Fibre Channel, USB, PCIe, and NVMe. The host interface 620 may be a communication interface that facilitates transfer for data, control signals, and timing signals.

Back-end module 610 includes an error correction controller (ECC) engine 624 that encodes the data bytes received from the host and decodes and error corrects the data bytes read from the non-volatile memory. A command sequencer 626 generates command sequences, such as program and erase command sequences, to be transmitted to non-volatile memory dies 408. A RAID (redundant array of independent dies) module 628 manages generation of RAID parity and recovery of failed data. The RAID parity may be used as an additional level of integrity protection for the data being written into the storage device 400. In some cases, the RAID module 628 may be a part of the ECC engine 624. Note that the RAID parity may be added as an extra die or dies, or may be added within existing dies (e.g., as extra plane(s), extra block(s), or extra WL(s) within block(s). ECC engine 624 and RAID module 628 may calculate redundant data that can be used to recover when errors occur and may be considered examples of redundancy encoders. Together, ECC engine 624 and RAID module 628 may be considered to form a combined redundancy encoder 634. A memory interface 630 provides the command sequences to non-volatile memory die 408 and receives status information from non-volatile memory dies 408. In some examples, memory interface 630 may be a double data rate (DDR) interface. A flash control layer 632 controls the overall operation of back-end module 610.

Additional components of storage device 400 illustrated in FIG. 6 include media management layer 638, which performs wear leveling of memory cells of non-volatile memory dies 408. Storage device 400 also includes other discrete components 640, such as external electrical interfaces, external RAM, resistors, capacitors, or other components that may interface with controller 422. In other examples, one or more of the physical layer interface 622, media management layer 638, and buffer management/bus controller 614 are optional components that are not necessary in the controller 422.

The Flash Translation Layer (FTL) or Media Management Layer (MML) 638 may be integrated as part of the flash management that may handle flash errors and interfacing with the host. In particular, MML may be a module in flash management and may be responsible for the internals of NAND management. In particular, the MML 638 may include an algorithm in the storage device firmware which translates writes from the host into writes to the flash memory structure 426 of memory dies 408. The MML 638 may be used because, for example, the flash memory may have limited endurance, the flash memory structure 426 may only be written in multiples of pages, or the flash memory structure 426 may not be written unless it is erased as a block (e.g., a block may be considered to be a minimum unit of erase and such a non-volatile memory may be considered a block-erasable non-volatile memory). The MML 638 is configured to operate under these potential limitations of the flash memory structure 426, which may not be visible to the host. Accordingly, the MML 638 attempts to translate the writes from host into writes into the flash memory structure 426.

Controller 422 may interface with one or more memory dies 408. In one example, controller 422 and multiple memory dies 408 (e.g., together making up the storage device 400) implement an SSD, which can emulate, replace, or be used instead of a hard disk drive inside a host device, as a NAS device, or the like. Additionally, the SSD need not be made to work as a hard drive.

Based on the above, examples of the present application describe a storage device, comprising: at least one memory die; and a controller electrically connected the at least one memory die, the controller configured to: identify a dirty block of the at least one memory die, the dirty block being a memory block that was subject to an interrupted write operation; perform a coarse inspection of one or more pages of the dirty block, each iteration of the coarse inspection including: requesting a first number of bytes of a current page of the dirty block from the at least one memory die; receiving contents of the first number of bytes from the at least one memory die; and evaluating a state of the current page based, at least in part, on the contents of the first number of bytes; determine an initial last good page of the dirty block based, at least in part, on the coarse inspection; perform a fine inspection of at least one page of the dirty block based, at least in part, on contents of a second number of bytes of the at least one page of the dirty block, the second number of bytes being greater than the first number of bytes, the fine inspection validating the initial last good page identified by the coarse inspection; and identify the initial last good page as an actual last good page of the dirty block. In an example, the memory die includes a plurality of blocks of NAND memory. In an example, evaluating the state of the current page includes evaluating one of a count of 0-bits and a count of 1-bits of the contents of the first number of bytes in relation to at least one threshold. In an example, evaluating the state of the current page includes assigning a state of one of fully programmed, partially programmed, and fully erased to the current page. In an example, performing a fine inspection of the at least one page comprises: requesting the second number of bytes from a first page of the dirty block; requesting the second number of bytes from a second page of the dirty block, the second page being adjacent in page index number to the first page; determining a fine state of the first page and a fine state of the second page; and identifying that the fine state of the first page matches an expected state and the fine state of the second page is different than the fine state of the first page. In an example, the controller is further configured to revert to coarse inspection of the dirty block when a fine inspection does not validate the coarse inspection. In an example, the second number of bytes used during the fine inspection is a number of bytes greater than or equal to one quarter of a page size of the dirty block and less than the page size.

Examples also describe a memory die, comprising: one or more NAND flash memory modules; and a circuitry component configured to: receive a command to identify a last good page of a memory block; perform a coarse inspection of one or more pages of the memory block, each iteration of the coarse inspection including: sensing a first number of bytes of a current page of the memory block from the one or more NAND flash memory modules; and evaluating a state of the current page based, at least in part, on contents of the first number of bytes; determine an initial last good page of the memory block based, at least in part, on the coarse inspection; perform a fine inspection of at least one page of the memory block based, at least in part, on contents of a second number of bytes of the at least one page, the second number of bytes being greater than the first number of bytes, the fine inspection validating the initial last good page identified by the coarse inspection; and transmit an index identifier of the last good page in response to the command to find the last good page. In an example, evaluating the state of the current page includes evaluating one of a count of 0-bits and a count of 1-bits of the contents of the first number of bytes in relation to at least one threshold. In an example, evaluating the state of the current page includes assigning a state of one of fully programmed, partially programmed, and fully erased to the current page. In an example, performing a fine inspection of at least one page includes: sensing the second number of bytes from a first page of the block; sensing the second number of bytes from a second page of the block, the second page being adjacent in page index number to the first page; determining a fine state of the first page and a fine state of the second page; and identifying that the fine state of the first page matches an expected state and the fine state of the second page is different than the fine state of the first page. In an example, the circuitry component is further configured to revert to coarse inspection of the block when a fine inspection does not validate the coarse inspection. In an example, the second number of bytes used by during the fine inspection is a number of bytes greater than or equal to one quarter of a page size of the block and less than the page size.

Additional examples describe a method for finding a last good page of a dirty block of non-volatile memory, the method comprising: identifying the dirty block within the non-volatile memory, the dirty block being a memory block that was subject to an interrupted input/output (I/O) operation, the interrupted I/O operation being one of a write operation and an erase operation; performing a coarse inspection of one or more pages of the dirty block, each iteration of the coarse inspection including: requesting a first number of bytes of a current page of the dirty block from the non-volatile memory; receiving contents of the first number of bytes from the non-volatile memory; and evaluating a state of the current page based, at least in part, on the contents of the first number of bytes; determining an initial last good page of the dirty block based, at least in part, on the coarse inspection; performing a fine inspection of at least one page of the dirty block based, at least in part, on contents of a second number of bytes of the at least one page of the dirty block, the second number of bytes being greater than the first number of bytes, the fine inspection validating the last good page identified by the coarse inspection; and initiating a remainder of the interrupted I/O operation starting after the last good page of the dirty block, the remainder including one of writing a remainder of data after the last good page and erasing pages after the last good page. In an example, the non-volatile memory includes at least one memory die having a plurality of blocks of NAND memory. In an example, evaluating the state of the current page includes evaluating one of a count of 0-bits and a count of 1-bits of the contents of the first number of bytes in relation to at least one threshold. In an example, evaluating the state of the current page includes assigning a state of one of fully programmed, partially programmed, and fully erased to the current page. In an example, performing a fine inspection of at least one page includes: requesting the second number of bytes from a first page of the dirty block; requesting the second number of bytes from a second page of the dirty block, the second page being adjacent in page index number to the first page; determining a fine state of the first page and a fine state of the second page; and identifying that the fine state of the first page matches an expected state and the fine state of the second page is different than the fine state of the first page. In an example, the method includes reverting back to coarse inspection of the dirty block when a fine inspection does not validate the coarse inspection. In an example, the second number of bytes used by during the fine inspection is a number of bytes greater than or equal to one quarter of a page size of the dirty block and less than the page size.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device. Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to examples of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute by way of the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A storage device, comprising:
   at least one memory die; and
   a controller electrically connected the at least one memory die, the controller configured to:
      identify a dirty block of the at least one memory die, the dirty block being a memory block that was subject to an interrupted write operation;
      perform a coarse inspection of one or more pages of the dirty block, each iteration of the coarse inspection including:
         requesting a first number of bytes of a current page of the dirty block from the at least one memory die;
         receiving contents of the first number of bytes from the at least one memory die; and
         evaluating a state of the current page based, at least in part, on the contents of the first number of bytes;
      determine an initial last good page of the dirty block based, at least in part, on the coarse inspection;
      perform a fine inspection of at least one page of the dirty block based, at least in part, on contents of a second number of bytes of the at least one page of the dirty block, the second number of bytes being greater than the first number of bytes, the fine inspection validating the initial last good page identified by the coarse inspection; and
      identify the initial last good page as an actual last good page of the dirty block.

2. The storage device of claim 1, wherein the memory die includes a plurality of blocks of NAND memory.

3. The storage device of claim 1, wherein evaluating the state of the current page includes evaluating one of a count of 0-bits and a count of 1-bits of the contents of the first number of bytes in relation to at least one threshold.

4. The storage device of claim 1, wherein evaluating the state of the current page includes assigning a state of one of fully programmed, partially programmed, and fully erased to the current page.

5. The storage device of claim 1, wherein performing a fine inspection of the at least one page comprises:
   requesting the second number of bytes from a first page of the dirty block;
   requesting the second number of bytes from a second page of the dirty block, the second page being adjacent in page index number to the first page;
   determining a fine state of the first page and a fine state of the second page; and
   identifying that the fine state of the first page matches an expected state and the fine state of the second page is different than the fine state of the first page.

6. The storage device of claim 1, wherein the controller is further configured to revert to coarse inspection of the dirty block when a fine inspection does not validate the coarse inspection.

7. The storage device of claim 1, wherein the second number of bytes used during the fine inspection is a number of bytes greater than or equal to one quarter of a page size of the dirty block and less than the page size.

8. A memory die, comprising:
   one or more NAND flash memory modules; and
   a circuitry component configured to:
      receive a command to identify a last good page of a memory block;
      perform a coarse inspection of one or more pages of the memory block, each iteration of the coarse inspection including:
         sensing a first number of bytes of a current page of the memory block from the one or more NAND flash memory modules; and
         evaluating a state of the current page based, at least in part, on contents of the first number of bytes;
      determine an initial last good page of the memory block based, at least in part, on the coarse inspection;
      perform a fine inspection of at least one page of the memory block based, at least in part, on contents of a second number of bytes of the at least one page, the second number of bytes being greater than the first number of bytes, the fine inspection validating the initial last good page identified by the coarse inspection; and
   transmit an index identifier of the last good page in response to the command to find the last good page.

9. The memory die of claim 8, wherein evaluating the state of the current page includes evaluating one of a count of 0-bits and a count of 1-bits of the contents of the first number of bytes in relation to at least one threshold.

10. The memory die of claim 8, wherein evaluating the state of the current page includes assigning a state of one of fully programmed, partially programmed, and fully erased to the current page.

11. The memory die of claim 8, wherein performing a fine inspection of at least one page includes:
   sensing the second number of bytes from a first page of the block;
   sensing the second number of bytes from a second page of the block, the second page being adjacent in page index number to the first page;

determining a fine state of the first page and a fine state of the second page; and identifying that the fine state of the first page matches an expected state and the fine state of the second page is different than the fine state of the first page.

12. The memory die of claim 8, wherein the circuitry component is further configured to revert to coarse inspection of the block when a fine inspection does not validate the coarse inspection.

13. The memory die of claim 8, wherein the second number of bytes used by during the fine inspection is a number of bytes greater than or equal to one quarter of a page size of the block and less than the page size.

14. A method for finding a last good page of a dirty block of non-volatile memory, the method comprising:

identifying the dirty block within the non-volatile memory, the dirty block being a memory block that was subject to an interrupted input/output (I/O) operation, the interrupted I/O operation being one of a write operation and an erase operation;

performing a coarse inspection of one or more pages of the dirty block, each iteration of the coarse inspection including:

requesting a first number of bytes of a current page of the dirty block from the non-volatile memory;

receiving contents of the first number of bytes from the non-volatile memory; and evaluating a state of the current page based, at least in part, on the contents of the first number of bytes;

determining an initial last good page of the dirty block based, at least in part, on the coarse inspection;

performing a fine inspection of at least one page of the dirty block based, at least in part, on contents of a second number of bytes of the at least one page of the dirty block, the second number of bytes being greater than the first number of bytes, the fine inspection validating the last good page identified by the coarse inspection; and initiating a remainder of the interrupted I/O operation starting after the last good page of the dirty block, the remainder including one of writing a remainder of data after the last good page and erasing pages after the last good page.

15. The method of claim 14, wherein the non-volatile memory includes at least one memory die having a plurality of blocks of NAND memory.

16. The method of claim 14, wherein evaluating the state of the current page includes evaluating one of a count of 0-bits and a count of 1-bits of the contents of the first number of bytes in relation to at least one threshold.

17. The method of claim 14, wherein evaluating the state of the current page includes assigning a state of one of fully programmed, partially programmed, and fully erased to the current page.

18. The method of claim 14, wherein performing a fine inspection of at least one page includes:

requesting the second number of bytes from a first page of the dirty block;

requesting the second number of bytes from a second page of the dirty block, the second page being adjacent in page index number to the first page;

determining a fine state of the first page and a fine state of the second page; and identifying that the fine state of the first page matches an expected state and the fine state of the second page is different than the fine state of the first page.

19. The method of claim 14, further comprising reverting back to coarse inspection of the dirty block when a fine inspection does not validate the coarse inspection.

20. The method of claim 14, wherein the second number of bytes used by during the fine inspection is a number of bytes greater than or equal to one quarter of a page size of the dirty block and less than the page size.

* * * * *